Figure 1:
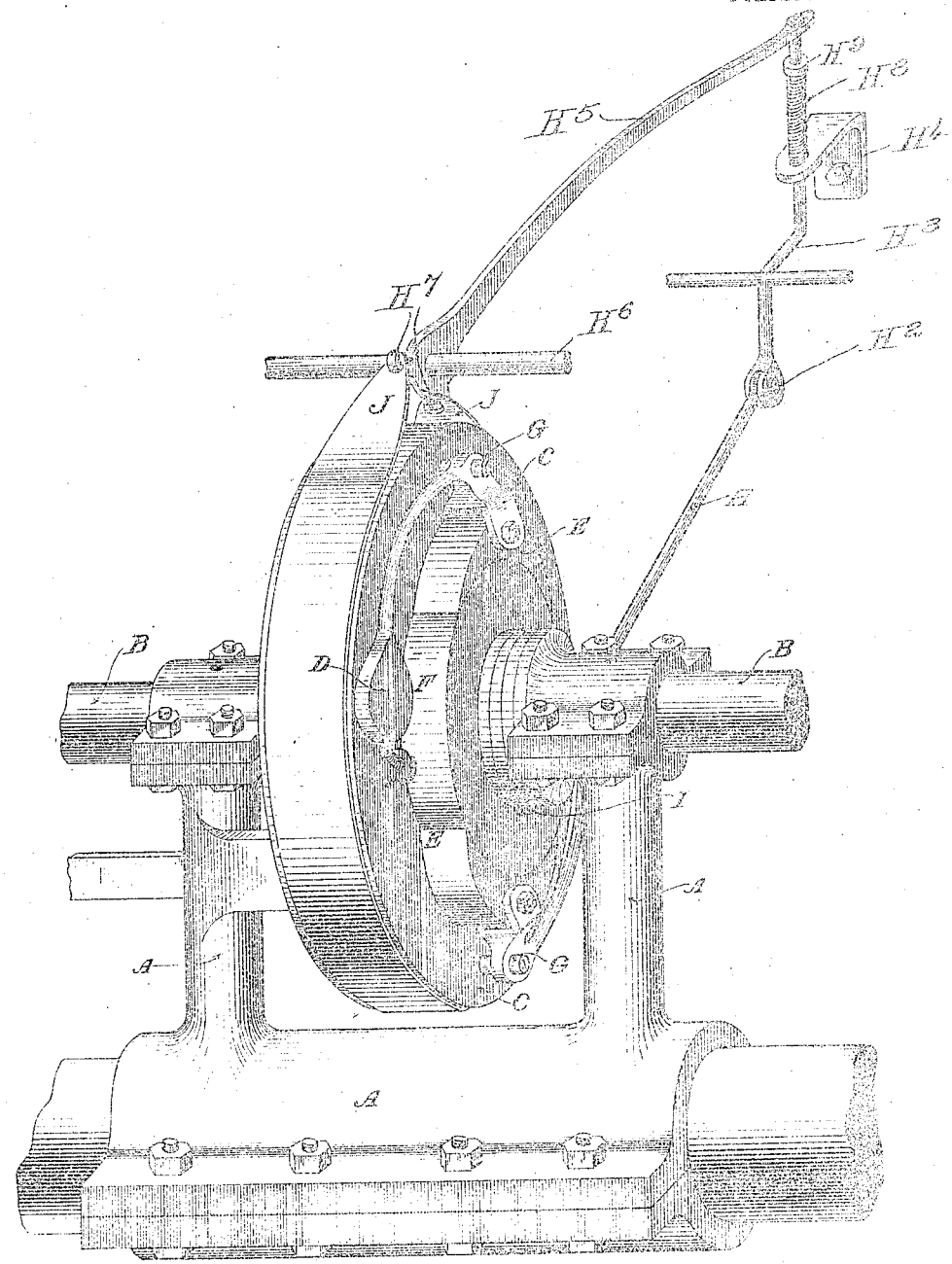

A. C. ALEXANDER.
AUTOMATIC BRAKE.
APPLICATION FILED MAR. 31, 1911.

1,013,918.

Patented Jan. 9, 1912.
2 SHEETS—SHEET 2.

Witnesses
Edward G. Allen
Thomas J. Drummond

Inventor
Anson C. Alexander
per Edwards Head & Smith
Attorneys.

UNITED STATES PATENT OFFICE.

ANSON C. ALEXANDER, OF PENACOOK, NEW HAMPSHIRE.

AUTOMATIC BRAKE.

1,013,918. Specification of Letters Patent. Patented Jan. 9, 1912.

Application filed March 31, 1911. Serial No. 618,173.

*To all whom it may concern:*

Be it known that I, ANSON C. ALEXANDER, a citizen of the United States, and resident of Penacook, county of Merrimack, and State of New Hampshire, have invented an Improvement in Automatic Brakes, of which the following description, in connection with the accompanying drawing, is a specification, like characters on the drawing representing like parts.

This invention relates to an automatic brake, and is particularly designed for use in connection with automobiles, but the invention is not restricted to that use and is applicable to the automatic braking or control of any rotating member.

The object of the invention is to secure a device which will act quickly upon the attainment of a predetermined speed and which will exert a powerful force immediately to secure the immediate retardation or stopping of the rotating member.

The invention is also directed to securing a construction of automatic brake which shall be of simple construction, strong in its parts, not liable to get out of order, and capable of withstanding the effects of frequent and sudden action.

The nature of the invention will more fully appear from the accompanying description and drawings and will be particularly pointed out in the appended claims.

The drawings represent a preferred form of device embodying the invention and shown in connection with the driving axle of an automobile.

Figure 2:
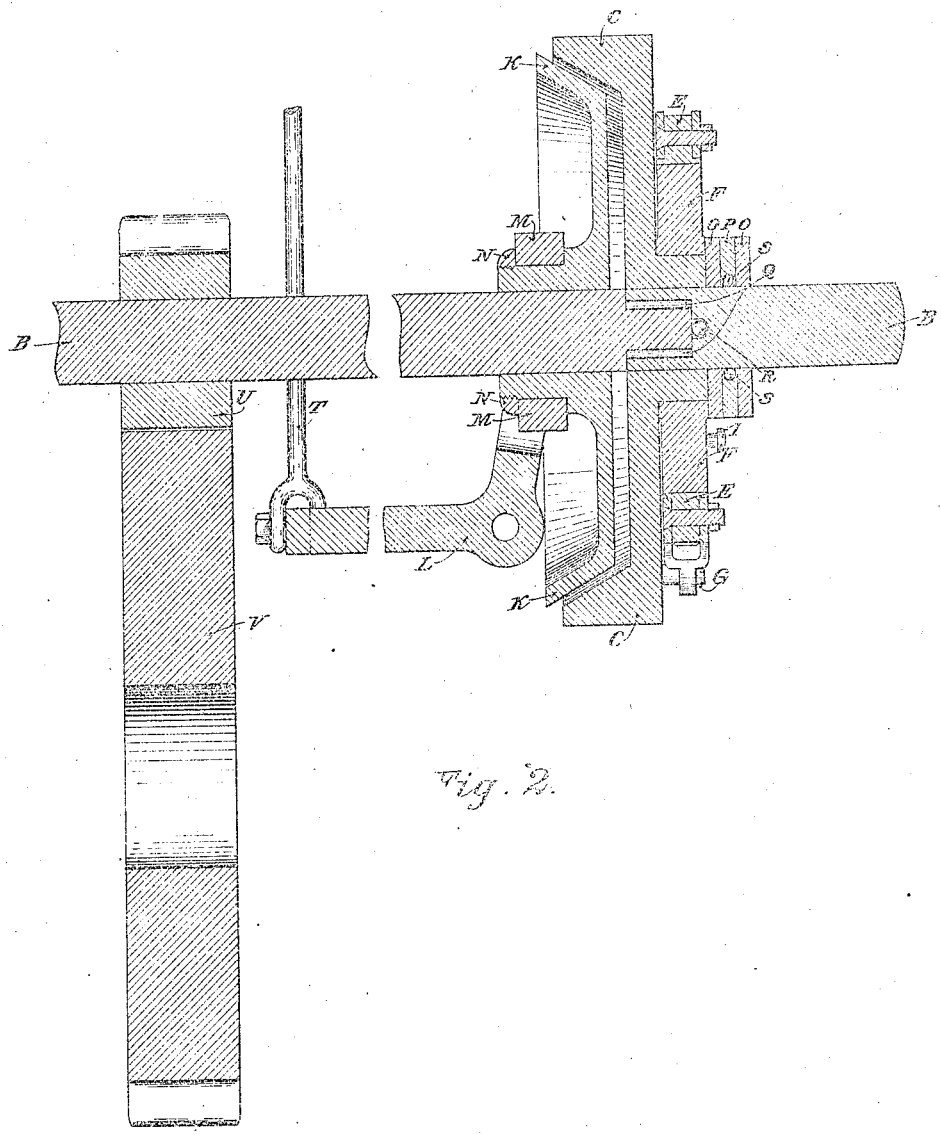

In the drawings, Figure 1 is a view in perspective of a portion of the rear axle casing of an automobile with a device embodying the invention supported thereon; Fig. 2 is a view in longitudinal vertical central cross section of the main features shown in Fig. 1, and in addition of a pinion and gear.

The device herein illustrated is shown as particularly adapted in its construction and arrangement for use as a brake upon an automobile. The rear axle of such a vehicle is shown in the lower portion of Fig. 1, and the device is shown as supported therefrom. In the form illustrated this support is indicated at A as a sleeve clamped on the rear axle casing and including upwardly projecting pillars or posts in which is supported in suitable bearings an auxiliary shaft B. This shaft B is connected to the rear axle by means of the pinion U and the gear V so that the shaft B is driven from the rear axle. The purpose of the auxiliary shaft B is to secure as the direct actuator for the brake a shaft which is running at a much higher rate of speed than the rear axle of the vehicle. It is evident, however, that this arrangement of auxiliary shaft is not essential to the invention and that it is not necessary for the braking mechanism to be removed from the shaft whose rotation it is to control.

It is preferable and essential for certain uses that the brake shall be capable of being thrown into and out of connection with the rotary member, and for that purpose a clutch mechanism to be described is provided. A clutch mechanism of the form illustrated requires the shaft B to be formed in two parts, and it is so illustrated, these parts being separately rotatable and being separated by the roller bearing rolls Q and thrust bearing R. A drum C is fixedly mounted on one section of the shaft B, as the right hand section, and is formed on its left hand face with a frusto-conical surface to form a clutch part. The other, or left hand section, of the shaft B supports longitudinally slidable thereon, but non-rotatable with respect thereto, a coöperating frusto-conical clutch member K. This clutch member K has a shouldered sleeve surrounding the shaft B. In an annular groove formed on the sleeve between its shoulder and a ring N screw-threaded thereon is mounted a collar M. A bell crank lever L fulcrumed to any fixed part of the machine is connected at one end to the collar M and at its other end to an operating rod T so that upon the reciprocation of the operating rod T the clutch member K may be slid on the shaft B and into and out of engagement with the clutch face of the drum C, thus connecting and disconnecting the drum C to the left hand section of the shaft B which carried the pinion U. An auxiliary drum F is mounted on the shaft B to rotate freely with respect thereto, and in the form illustrated this auxiliary drum F is journaled on a sleeve projecting from the drum C around the shaft B. The drum C is surrounded with a band friction brake J consisting of a strip of steel, and it will be seen that upon drawing the ends of the strip J together the friction between the band or strip and the periphery of the drum will soon bring the latter to a standstill. The operation of the clamping band J on the periphery of the drum D is secured by the partial rotation of the auxiliary drum F and for that purpose suitable connections are provided between the auxiliary drum F and the friction band J. These connections are so constructed and arranged as to multiply greatly the force exerted by the rotation of the auxiliary drum F so that when this force is applied to the clamping friction band J a comparatively enormous force is secured and the braking action is made quickly and completely effective.
In the form shown a link H extends from an eccentric pivot I on the drum F and is pivotally connected at its other end at $H^2$ to a bell crank $H^3$ mounted in any suitable adjacent support. This bell crank lever extends at one end up through an apertured bracket $H^4$ secured to any suitable adjacent support and is connected at its upper end to a lever $H^5$ fulcrumed at $H^6$ and having arms $H^7$ engaging the ends of the band or strip J. A spring $H^8$ surrounds the upper end of the bell crank lever $H^3$ and abuts against the bracket $H^4$ and a collar $H^9$ carried by itself so that the action of this spring $H^8$ is to raise the lever $H^5$ and release the friction band from the periphery of the drum C, while the opposite action of the lever $H^5$ is to bring the ends of the band J together, thus causing great friction. The rotary movement of the auxiliary drum F is secured automatically from the drum C. Levers D are fulcrumed at G to the drum C and carry pivoted on their shorter arms segmental brake shoes E adapted to engage the periphery of the auxiliary drum F, while their longer arms are heavily weighted and preferably connected by adjustable springs to the drum. Immediately the drum C starts to revolve the centrifugal force exerted tends to throw outwardly the longer arms of the levers D, thus bringing the brake shoes into contact with the auxiliary drum F and causing it to start and rotate with the drum C, but immediately the auxiliary drum F starts to rotate the friction band J stops the rotation of the drum C through the intermediate connections already described.

In the case of an automobile the clutch for connecting the drum C to the shaft B will be used, and whenever it was desired to stop the automobile the clutch would be operated and thereupon the drum C would begin to revolve. The levers D would be arranged by reason of the weights and springs and their general construction to bring the brake shoes E into contact with the auxiliary drum F upon the exertion of a centrifugal force caused by a speed of rotation predetermined, as the one at which the automobile should be stopped. If the clutch is left in action, or a clutch is not used, then the shaft or rotary member will be automatically prevented from attaining a speed of rotation greater than a predetermined maximum.

Having fully described my invention what I claim as new and desire to secure by Letters Patent is:

1. An automatic brake comprising a rotating member, a rotarily mounted main drum, means for connecting said member and said main drum to cause them to rotate together, an auxiliary drum mounted to rotate concentrically with and independenly of said main drum, a brake shoe carried by the main drum and in coöperative relation with the auxiliary drum, centrifugally-controlled means carried by said main drum to bring the brake shoe against the auxiliary drum upon the rotation of the main drum at a certain speed, a friction brake in coöperative relation with the main drum, and connections between said auxiliary drum and said friction brake whereby rotary movement of the former sets the latter.

2. An automatic brake comprising a rotary main drum, an auxiliary drum mounted to rotate concentrically with and independently of said main drum, a brake shoe carried by the main drum and adapted to bear upon the periphery of the auxiliary drum, centrifugally-controlled means carried by said main drum to operate the brake shoe upon a predetermined speed of rotation of the main drum, a friction brake in coöperative relation with the main drum, and connections between said auxiliary drum and said friction brake whereby rotary movement of the former sets the latter.

3. An automatic brake comprising a rotary main drum, an auxiliary drum mounted to rotate concentrically with and independently of said main drum, a brake shoe carried by the main drum and adapted to bear upon the periphery of the auxiliary drum, centrifugally-controlled means carried by said main drum to operate the brake shoe upon a predetermined speed of rotation of the main drum, a friction brake in coöperative relation with the main drum, and connections including multiplying levers between said auxiliary drum and said friction brake whereby rotary movement of the former sets the latter.

4. An automatic brake comprising a rotary main drum, an auxiliary drum mounted to rotate concentrically with and independently of said main drum, a lever fulcrumed on the side of said main drum, a brake shoe carried by the shorter arm of said lever and in coöperative relation with the periphery of the auxiliary drum whereby upon the rotation of the main drum at a predetermined speed centrifugal force acting upon the longer arm of the lever will bring the brake shoe into engagement with the auxiliary drum and braking means connected with and actuated by said auxiliary drum.

5. An automatic brake comprising a rotary main drum, an auxiliary drum mounted to rotate concentrically with and independently of said main drum, a lever fulcrumed on the side of said main drum, a brake shoe carried by the shorter arm of said lever and in coöperative relation with the periphery of the auxiliary drum whereby upon the rotation of the main drum at a predetermined speed centrifugal force acting upon the longer arm of the lever will bring the brake shoe into engagement with the auxiliary drum, a friction brake in coöperative relation with the main drum, and connections between said auxiliary drum and said friction brake whereby rotary movement of the former sets the latter.

In testimony whereof, I have signed my name to this specification, in the presence of two subscribing witnesses.

ANSON C. ALEXANDER.

Witnesses:
   GEORGIANNA CHANDLER,
   HORACE B. SHERBURNE.